United States Patent [19]

Brehm

[11] Patent Number: 5,053,260

[45] Date of Patent: Oct. 1, 1991

[54] EMBOSSING FOIL

[75] Inventor: Ludwig Brehm, Hemhofen, Fed. Rep. of Germany

[73] Assignee: Leonhard Kurz GmbH & Co., Fuerth, Fed. Rep. of Germany

[21] Appl. No.: 527,571

[22] Filed: May 23, 1990

[30] Foreign Application Priority Data

Aug. 11, 1989 [DE] Fed. Rep. of Germany ....... 3926578

[51] Int. Cl.[5] ................................................ B32B 9/00

[52] U.S. Cl. ...................................... 428/40; 428/195; 428/202; 428/204; 428/219; 428/323; 428/914; 428/915; 428/916; 428/332; 428/334; 428/422.8; 428/457

[58] Field of Search ...................... 428/195, 40, 411.1, 428/323, 204, 207, 219, 422.8, 457, 914, 915, 916, 332, 334

[56] References Cited

U.S. PATENT DOCUMENTS 4,717,615 1/1988 Reinhart ............................ 428/916
4,759,969 7/1988 Sander ................................ 428/209
4,837,072 6/1989 Kraetschmer ....................... 428/914

FOREIGN PATENT DOCUMENTS 3926578 7/1990 Fed. Rep. of Germany .

*Primary Examiner*—Patrick J. Ryan
*Attorney, Agent, or Firm*—Louis E. Marn

[57] ABSTRACT

An embossing foil such as a hot embossing foil is of a laminate structure comprising in succession a backing foil, a separating layer, a transparent cover lacquer, a decorative layer means and a foundation layer of an at least translucent material. The decorative layer means successively comprises a first decorative layer adjacent to the cover lacquer layer, an opaque intermediate layer and a second decorative layer adjacent to the foundation layer. The opaque intermediate layer can be covered at least on one side with a single-colored layer over a large area thereof.

9 Claims, 1 Drawing Sheet

EMBOSSING FOIL

BACKGROUND OF THE INVENTION

The invention relates to an embossing foil such as a hot embossing foil.

Embossing foils may be used for example in the production of documents such as credit cards, identity cards and the like, and a typical form of an embossing foil, as is to be found for example in DE 29 16 723 C2, is in the form of a laminate comprising a succession of a backing foil, an optional separating layer, a transparent cover lacquer layer, a decorative layer and a foundation layer.

As however the above-indicated embossing foil is only decorated on one side, the production of articles which each have a decorative effect on both of their sides requires the use of two such embossing foils. The two embossing foils which are independent of each other must be fed to the article to be decorated therewith, in precisely the correct position. However, that can be a difficult and complicated matter in particular if the two embossing foils are for example of such a nature that they have different stretch properties from each other. A considerable amount of expenditure is also required in that situation in order to ensure not only that the two embossing foils with their decorative effects are fed to the article to be decorated therewith in precisely the correct position, but also to ensure that, during the embossing operation, the two embossing foils are also passed to an embossing station which is provided for that purpose, in precisely the correct positions relative to each other. That operation requires high-precision equipment as well as a not inconsiderable amount of time, in order to produce articles which are decorated on both sides in that way.

A brochure from Leonhard Kurz GmbH & Co, of the Federal Republic of Germany, entitled 'Das Pragen auf Kunststoffen', page 18, discloses what is referred to as 'counter-embossing', involving embossing a highly transparent substrate from the rear thereof. That procedure involves the use of special embossing foils which have their decorative layer of such a nature that the decoration faces away from the backing foil. In addition, articles which are embossed by a counter-embossing process may then also be covered on their rear with a coloured lacquer, or may have material injected on the back thereof, with the embossed image still remaining visible. A serious disadvantage of such a procedure is that the embossing can easily be damaged, both when applying the coloured lacquer to the back of the article and also when carrying out the rear injection operation. Particularly in the latter case, the relatively high temperature involved can give rise to the risk of distortion or peeling of the decorative layer of the counter-foil, due to the lacquer to be applied to the back of the article. In addition double-sided decoration has not been achieved hitherto in the counter-embossing process with an embossing foil.

SUMMARY OF THE INVENTION

An object of the present invention is to provide an embossing foil which readily lends itself to the production of articles which appear decorated on both sides, in a simple and time-saving fashion.

Another object of the present invention is to provide an embossing foil which affords greater versatility in terms of a decorative effect to be afforded thereby.

Still another object of the present invention is to provide an embossing foil in which component portions thereof are closely interrelated so as to provide a more rational production procedure and a satisfactory aspect.

In accordance with the present invention these and other objects are achieved by means of an embossing foil such as a hot embossing foil which is in the form of a laminate comprising in succession a backing foil, a separating layer, a transparent cover lacquer layer, a decorative layer means and a foundation means. The decorative layer means successively comprises a first decorative layer adjacent to the cover lacquer layer, an opqaue intermediate layer and a second decorative layer adjacent to the foundation means. The latter comprises an at least translucent material.

As will be seen in greater detail hereinafter from a preferred embodiment, the two decorative layers are optically separated from each other by the intermediate layer which is opaque, that is to say it does not allow the transmission of light nor is it possible to see therethrough, so that the two decorative layers can provide two image configurations or motifs which are different from each other. The first decorative layer is visible through the transparent cover lacquer layer while the second decorative layer is visible through the foundation layer. Accordingly such an embossing foil readily makes it possible to provide an article which appears decorated on both sides thereof. Such an article may be for example a card, for example a credit card, an identity card, or the like. The fact that the foundation layer comprises an at least translucent material means that it is possible if desired to achieve particular optical effects such as for example a mother-of-pearl effect or the like.

In an advantageous feature of the invention, the foundation means may comprise a highly transparent material which is thus as clear as glass. The second decorative layer is thus highly visible through such a foundation layer. That may be particularly advantageous when the second decorative layer is produced for example by a multi-color printing process.

Preferably, the opaque intermediate layer is a layer of lacquer containing at least one metal pigment. A layer of lacquer of that kind may be produced on the laminate structure forming the embossing foil in the same way as the separating layer, the transparent cover lacquer layer and the foundation layer so that manufacture of the embossing foil can involve the use of a relatively simple piece of equipment in which firstly the first decorative layer is produced, then the opaque intermediate layer is formed on the first decorative layer, and then the second decorative layer is formed on the opaque intermediate layer. The use of a single piece of equipment for producing the laminate structure in that way makes it easily possible to provide the two decorative layers with decoration effects which are properly disposed in relation to each other.

In a preferred feature of the invention the opaque intermediate layer may be covered at least on one side with a single-colored color layer over a large area thereof. That is particularly advantageous when the opaque intermediate layer is combined with a multi-colored decorative layer. In that case the single-colored layer serves as a foundation layer for the associated first and/or second decorative layer, while the single-colored layer can at the same time also produce an improvement in the adhesion of the corresponding decorative layer with which it is associated.

The or each single-colored layer is preferably white because such a layer does not affect the associated decorative layer in terms of its coloration or overall optical effect.

In accordance with another preferred feature, as indicated above, at least one of the two decorative layers may be a multi-color printed layer. That usually involves employing a four-color printing process because the entire color spectrum can be achieved by the use of four colors in that way.

In a preferred feature, the transparent cover lacquer layer is of the following composition:

| | |
|---|---|
| 4–5% by weight | ester-soluble nitrocellulose |
| 25 ± 3% by weight | silicone-modified polyester (solid matter 50%) |
| 25 ± 3% by weight | aromatic isocyanate (prepolymer, solid matter 50%) |
| Balance to 100% by weight | solvent. |

Preferably, the thickness of the cover lacquer layer is between 1 and 3 μm, and its weight in relation to surface area is preferably between about 1.6 and 2.7 g/m$^2$. The softening range of the transparent cover lacquer layer preferably lies at temperatures of between about 140° C. and 160° C.

The opaque intermediate layer is preferably of the following composition:

| | |
|---|---|
| 7 ± 2% by weight | aromatic polyurethane resin |
| 5 ± 1% by weight | ester-soluble nitrocellulose |
| 10 ± 2% by weight | urethane-modified ketone resin (mp = 140° C.) |
| 7 ± 2% by weight | aromatic isocyanate (solid matter 50%) |
| 17 ± 3% by weight | metallic pigment |
| Balance to 100% by weight | solvent. |

The thickness of the opaque intermediate layer is preferably between about 2 and 5 μm and its weight in relation to surface area can preferably be between about 1.8 and 2.8 g/m$^2$. The softening range of the opaque layer occurs at temperatures of ≧140° C.

The or each single-colored layer may be of the following composition:

| | |
|---|---|
| 7 ± 2% by weight | aromatic polyurethane resin |
| 5 ± 1% by weight | ester-soluble nitrocellulose |
| 10 ± 2% by weight | urethane-modified ketone resin (mp = 140° C.) |
| 7 ± 2% by weight | aromatic isocyanate (solid matter 50%) |
| 20 ± 3% by weight | rutile pigment |
| Balance to 100% by weight | solvent. |

The thickness of the or each single-colored layer is preferably between about 7 and 12 μm and its weight in relation to surface area is between about 7.5 and 10 g/m$^2$ and its softening temeprature occurs at ≧140° C.

Further objects, features and advantages of the present invention will be apparent from the following description of preferred embodiments of the embossing foil of the invention, in which respect it should be noted that the thicknesses of the various layers of the laminate structure constituting the embossing foil are not shown in a true-to-scale relationship.

DESCRIPTION OF PREFERRED EMBODIMENTS

Figure 1:
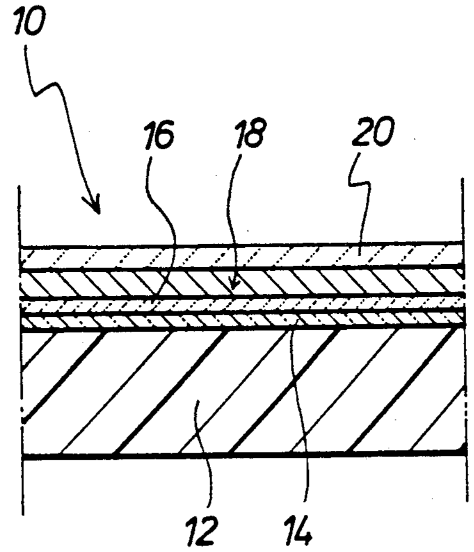
FIG. 1 is a view on a greatly enlarged scale of a portion of an embossing foil according to the teachings of the invention.

Referring to FIG. 1, shown therein is a sectional view on an enlarged scale of a portion of an embossing foil as indicated generally at 10, comprising a laminate structure involving in succession a backing foil 12, a separating layer 14 disposed on the backing foil 12, a transparent cover lacquer layer 16 arranged on the separating layer 14, a decorative layer means 18 on the cover lacquer layer 16, and a foundation or priming layer 20 on the decorative layer means 18.

Figure 2:
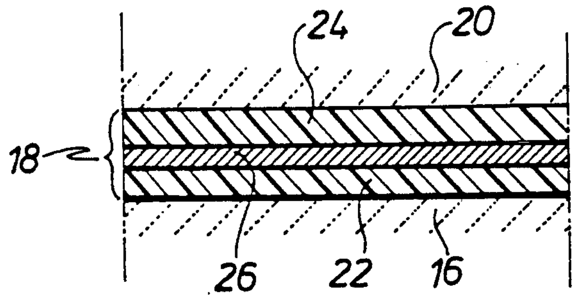
FIG. 2 is a view on a greatly enlarged scale of a portion from the decorative layer of the embossing foil shown in FIG. 1.

Referring now to FIG. 2, it will be seen therefrom that the decorative layer means 18 comprises a first decorative layer 22, a second decorative layer 24 and an opaque intermediate layer 26 between the first and second decorative layers 22 and 24. The first decorative layer 22 is adjacent to the cover lacquer layer 16 and the second decorative layer 24 is adjacent to the foundation layer 20. Such a configuration in respect of the decorative layer means may be adequate if the first and second decorative layers 22 and 24 are simple layers of one color, without a patterning effect.

Figure 3:
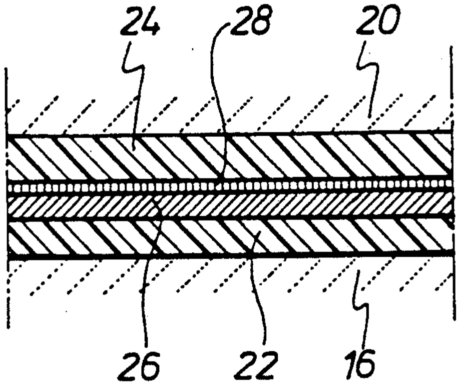
FIG. 3 is a view similar to FIG. 2 of a portion of a second embodiment of the decorative layer of the embossing foil according to the invention.

If however the first and/or second decorative layers 22 or 24 involve for example a multi-color printed layer, it is advantageous for a single-colored and preferably white layer 28 to be provided between the opaque intermediate layer 26 and the corresponding decorative layer in question. A single-colored layer 28 of that nature is to be seen in FIG. 3 between the opaque intermediate layer 26 and the second decorative layer 24. In other respects the laminate structure shown in FIG. 3 corresponds to that illustrated in FIG. 2, that is to say, the first decorative layer 22 is disposed on the cover lacquer layer 16 and the foundation layer 20 is adjoining the second decorative layer 24. The second decorative layer 24 is thus visible through the foundation layer 20 which preferably comprises a highly transparent material, while the first decorative layer 22 is visible through the transparent cover lacquer layer 16. That structure therefore provides an embossing foil 10 in which both decorative layers 22 and 24 are visible after removal of the backing foil 12. When a body of transparent material is fixed on the foundation layer 20 in a suitable procedure, that provides an article which appears decorated on both sides. As the two decorative layers 22 and 24 can be produced and in fact are preferably produced in a single piece of equipment, there is an accurate interrelationship between the structures or motifs of the two decorative layers so that in that way it is possible to produce articles which are decorated on both sides with the decorative effects thereof properly interrelated, in a simple and time-saving manner.

The various layers in the above-described embossing foil laminate structures may be of suitable compositions such as the preferred compositions set forth hereinbefore.

It will be appreciated that the above-described embossing foils have been set forth solely by way of example and illustration of the principles of the present invention and that various other modifications and alterations may be made therein without thereby departing from the spirit and scope of the invention.

I claim:

1. An embossing foil of a laminate structure comprising: a backing foil; a separating layer; a transparent cover lacquer layer; a decorative layer means; and a foundation layer of a translucent material, the decorative layer adjacent to the cover lacquer layer, an opaque intermediate layer and a second decorative layer adjacent to the foundation layer.

2. The embossing foil as set forth in claim 1 wherein said translucent material of said foundation layer is transparent.

3. The embossing foil as set forth in claim 1 wherein said opaque intermediate layer is lacquer containing a metal pigment.

4. The embossing foil as set forth in claim 1 wherein said opaque intermediate layer is covered on one side with a colored layer.

5. The embossing foil as set forth in claim 4 wherein said colored layer is white.

6. The embossing foil as set forth in claim 1 wherein one of said first and second decorative layers is a multicolored printed layer.

7. The embossing foil as set forth in claim 1 wherein said cover lacquer layer is comprised of: 4–5% by weight ester-soluble nitrocellulose, 25±3% by weight silicone-modified polyester (solid matter 50%), 25±3% by weight aromatic isocyanate (prepolymer, solid matter 50%) and remainder solvent to 100% by weight; said opaque intermediate layer having a thickness of between about 1 to 3 μm and being of a weight to surface area of between about 1.6 to 2.7 g/m$^2$.

8. The embossing foil as set forth in claim 3 wherein said opaque intermediate layer is comprised of: 7±2% by weight aromatic polyurethane resin, 5±1% by weight ester-soluble nitrocellulose, 10±2% by weight urethane-modified ketone resin (mp=140° C., 7±2% by weight aromatic isocyanate (solid matter 50%), 17±3% by weight metallic pigment and remainder solvent to 100% by weight; said opaque intermediate layer having a thickness of between about 2 to 5 μm and being of a weight to surface area of between about 1.8 to 2.8 g/m$^2$.

9. The embossing foil as set forth in claim 4 wherein said colored layer is comprised of: 7±2% by weight aromatic polyurethane resin, 5±1% by weight ester-soluble nitrocellulose, 10±2% by weight urethane-modified ketone resin (mp=140° C.), 7±2% by weight aromatic isocyanate (solid matter 50%), 20±3% by weight rutile pigment and remainer solvent to 100% by weight,; said colored layer having a thickness of between about 7 to 12 μm and being of a weight to surface area of between about 7.5 to 10 g/m$^2$.

* * * * *